(12) United States Patent
Yanagi (10) Patent No.: US 7,264,192 B1
(45) Date of Patent: Sep. 4, 2007

(54) PARTICULATE MATTER VIBRO-FLUIDIZING APPARATUS

(75) Inventor: Shohan Yanagi, Tokyo (JP)

(73) Assignee: Nara Machinery Co., Ltd., Tokyo (JP)

(*) Notice: Subject to any disclaimer, the term of this patent is extended or adjusted under 35 U.S.C. 154(b) by 0 days.

(21) Appl. No.: 10/088,781

(22) PCT Filed: Sep. 20, 2000

(86) PCT No.: PCT/JP00/06405

§ 371 (c)(1),
(2), (4) Date: Jul. 25, 2002

(87) PCT Pub. No.: WO01/21314

PCT Pub. Date: Mar. 29, 2001

(30) Foreign Application Priority Data

Sep. 22, 1999 (JP) .................. 11/268333
Apr. 11, 2000 (JP) .................. 2000/109878

(51) Int. Cl.
*B02C 17/14* (2006.01)
(52) U.S. Cl. ..................................... 241/179
(58) Field of Classification Search ........ 241/170–175, 241/179, 283
See application file for complete search history.

(56) References Cited

U.S. PATENT DOCUMENTS 2,983,454 A    5/1961   Podmore, Jr. et al.
6,036,126 A *  3/2000   Cappola ....................... 241/69

FOREIGN PATENT DOCUMENTS

| JP | 55-76033    | 5/1980  |
| JP | 55-171334   | 12/1980 |
| JP | 59-171754   | 11/1984 |
| JP | 62-39839    | 3/1987  |
| JP | 63-16052    | 1/1988  |
| JP | H04-45535   | 4/1992  |
| JP | 63-115438   | 7/1998  |

* cited by examiner

Primary Examiner—Mark Rosenbaum
(74) Attorney, Agent, or Firm—Christensen O'Connor Johnson Kindness PLLC (57) ABSTRACT

An object is to provide a particulate matter vibro-fluidizing device capable of circulating particulate matter by vibro-fluidizing the particulate matter in such a manner that granules are homogeneously dispersed over an entire surface as a result of circulating most of particulate matter 3 so that the particulate matter appears at high speed without the necessity of using a fluid such as air or gas, or a medium such as impact balls etc., so that composite processes such as crushing of an agglomerate powder and dispersion, mixing and drying of particulate matter can be carried out directly with respect to the circulating particulate matter without the necessity of a complex mechanical structure. Treatment means for particulate matter 3 comprises different vibrating bodies 2 and 4 linking with vibrating means 1 being grouped together, and is configured in such a manner as to subject the particulate matter 3 to fluidization treatment due to the cooperative oscillating action caused between the different oscillators.

12 Claims, 7 Drawing Sheets

PARTICULATE MATTER VIBRO-FLUIDIZING APPARATUS

TECHNOLOGICAL FIELD

The present invention relates to a particulate matter vibro-fluidizing device used in crushing of an agglomerate powder, dispersion, mixing and drying of particulate matter and reactions with an atomized gas, et

PREFERRED EMBODIMENTS OF THE INVENTION

The following is a detailed description based on a particulate matter vibro-fluidizing device exemplified by the preferred embodiments of the present invention.

Figure 1:
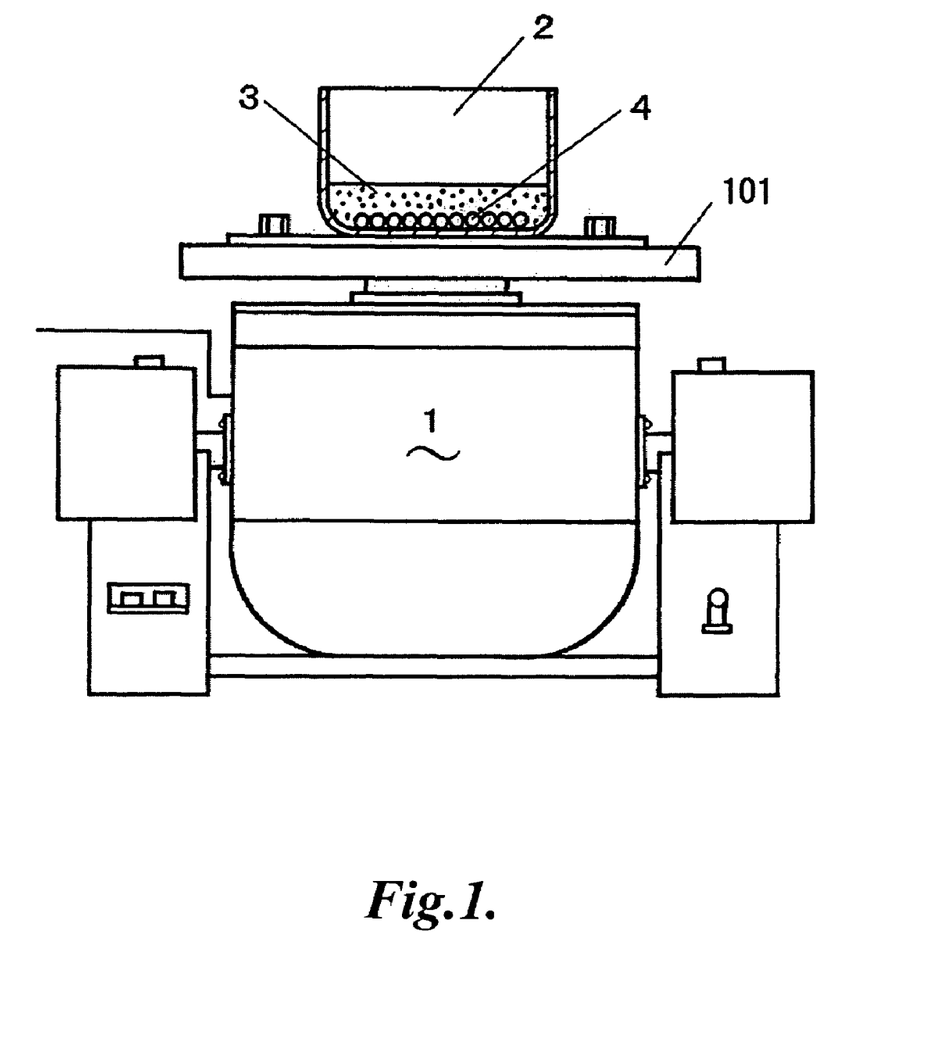
Figure 2A:
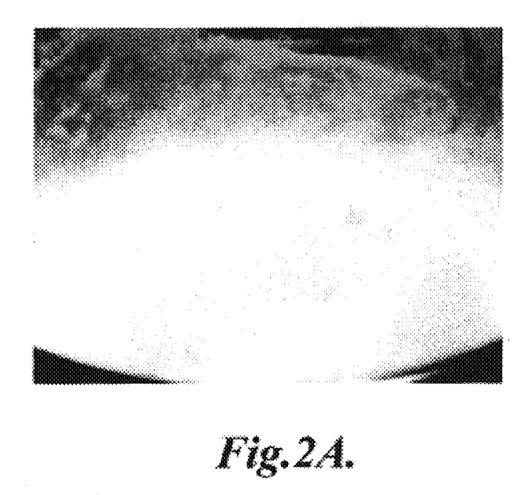
Figure 2B:
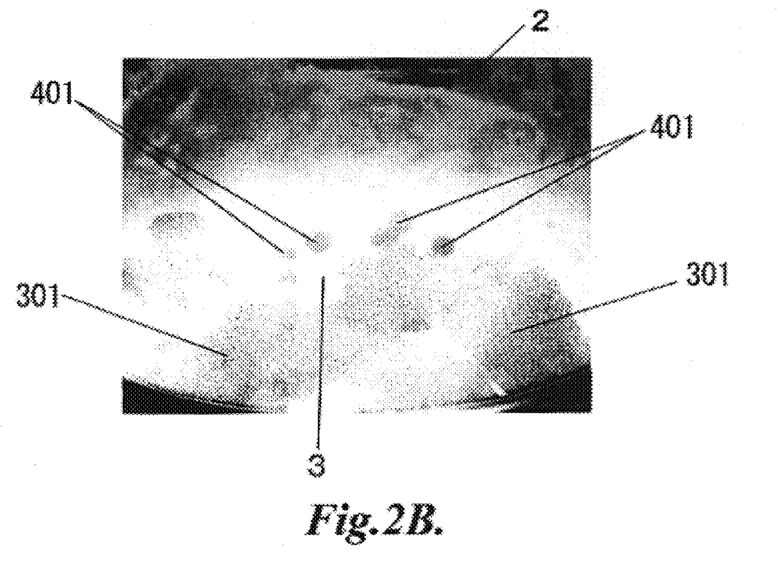
Figure 3A:
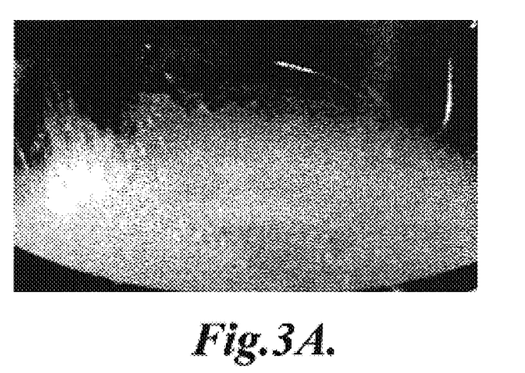
Figure 3B:
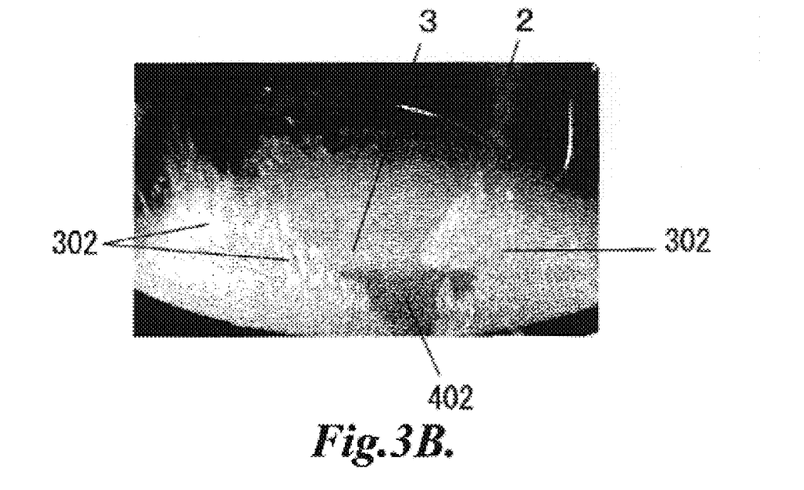

In a first embodiment shown in FIG. 1 to FIG. 3, FIG. 1 is a partially cut-away overall view of a vibro-fluidizing device. Numeral 1 indicates a vibrating device constituting a vibrating means. The vibrating device 1 is an electrically driven vibrating device of the kind disclosed in Japanese publication of unexamined application No. H08-193911 and is provided with a fixed magnet mechanism furnished with a columnar central magnetic pole provided integrally at a lower surface of a vibrating table 101 and an annular magnetic pole facing the central magnetic pole at an outer peripheral surface of the central magnetic pole and having a drive coil, with one magnetic pole being an N pole and the other being an S pole. The drive coil is then vibrated up and down within the magnetic field provided mutually between the magnetic poles of the fixed magnet using a supply of alternating current to the drive coil and excitation force is applied to the vibrating table 101. Increases and decreases in the excitation force are actuated by increases and decreases in the frequency of the alternating current and the configuration is such that vibrations in the high frequency region are obtained.

The method (theory) of generating vibration is by no means limited to the above magnetic vibration and the use of ultrasonic vibration, magnetostrictive vibration, vibration due to imbalancing of electric motors or an appropriate combination of the vibration generating methods is also possible, and the vibration may be vertical, horizontal, or a combination of vertical and horizontal vibration.

Numeral 2 indicates a container into which the vibrating table 101 is fitted. The container 2 is filled with particulate matter 3, with a plurality of spherical bodies 401 constituting vibrating media 4 being introduced at the bottom of the container to construct an aggregate.

Vibrations of the vibrating table 101 generated in cooperation with the operation of the vibrating device 1 are directly transmitted to the container 2 and are indirectly transmitted to the spherical bodies 401 via the container 2. The container 2 and spherical bodies 401 constitute the group of different vibrating bodies 2 and 4 applying different vibrations to the particulate matter 3 to be treated. The particulate matter 3 is therefore subjected to fluidization treatment by the action of both bodies due to the cooperative relationship of the vibrations from the container 2 constituting one of the different types of vibrating body with the spherical bodies 401 constituting the other type of vibrating body.

A porous plate 402, rod, cylinder, or netlike body such as a mesh etc. may also be used as the vibrating media 4 in place of the spherical bodies 401, with the shape and material being arbitrary. Vibrations of the vibrating device are then directly transmitted to the porous plate 402 etc. and indirectly transmitted to the container 2 or other structural parts. A structure where the vibrating device 2 operates in direct cooperation with the container 2 and the vibrating medium 41 so that vibrations of different amplitudes and frequencies are directly transmitted is also possible providing that the configuration is capable of treating particulate matter 3 using the dual action of the vibrating bodies grouped together as different types of vibrating bodies.

Next, a description is given of an experimental example for vibro-fluidizational behavior of particulate matter when a vibro-fluidizing device of the above structure is employed. An electric micro-vibration exciter (MES451) made by Akashi Corporation was employed as the vibrating device 1.

[1] Experimental Example Employing Spherical Bodies as the Vibrating Medium.

When the particulate matter 3 is treated using spherical bodies 401, glass beads of an average particle diameter of 5 mm are used as the spherical bodies 401, the container 2 is filled to a height of approximately 1 cm with polyethylene particles (white) of an average diameter of 5 μm as the particulate matter 3 to form the particulate matter layer, and oscillations of a frequency of 1 to 10 kHz and amplitude of 0.1 to 10 mm are applied. The behavioral state of the vibro-fluidizing is shown in the form of a photograph in FIG. 2(A), and an illustration thereof is shown in FIG. 2(B). FIG. 2(B) is that shown in FIG. 2(A) with a jet flow 301 of the particulate matter and the spherical bodies 401 color-processed with respect to contrast and intensity in order to highlight the flow conditions.

First, when excitation force due to vertical vibration of the vibrating device is applied to the particulate matter 3 within the container 2, particulate matter present at the surface of the particulate matter layer momentarily moves to the bottom of the container 2 before reappearing at the surface after two or three seconds. In this behavioral state, flow behavior is observed with respect to mixing and dispersion from a state where a small amount of colored particles (red) of an average particle diameter of approximately 100 μm are put on a central portion of the surface of the particulate matter layer, but this flow behavior, even in the initial stage of vibration where excitation force is relatively slight, superior circulation occurs whereby the colored particles are momentarily and homogeneously dispersed over the entire area of the container 2 before reappearing again over the whole of the surface.

It can therefore be understood that mixing and dispersion of particulate matter of different physical properties (particle diameter, density, etc.) can be achieved in a short time.

Next, when excitation force is gradually increased to the high frequency region and behavior is observed, as shown in the photograph in FIG. 2(A), flow behavior can be confirmed where the particulate matter 3 spouts up in an atomized state from between the spherical bodies 401.

Describing this state based on FIG. 2(B), an intermittent jet flow 301 can be confirmed for the particulate matter 3 in a region where the spherical bodies 401 are laid in an initial spouting state that has the appearance of water boiling. When the excitation force is further increased, this becomes a continuous jet flow 301 in the central region of the container 2, with an intermittent jet flow 301 being confirmed at the outer peripheral region. During this time, the spherical bodies 401 rotate randomly so that spouting of the particulate matter 3 from a gap enclosed by neighboring spherical bodies 401 and movement towards the bottom of the container 2 is repeated, with particulate matter 3 dispersed at the side walls of the container 2 moving from the edge of the region where the spherical bodies 401 are laid towards the bottom part of the container 2.

Similarly, comparing with results observed for related vibro-fluidizing not employing the spherical bodies 401, the particulate matter 3 at the periphery is gradually covered until eventually all of the colored particles are covered so as not to be visible from the surface, which takes around one minute. The colored particles do not reappear even when applying vibration at high frequency regions where the excitation force is increased and circulation that is superior for dispersion and mixing can therefore not be confirmed.

[2] Experimental Example Employing a Porous Plate as the Vibrating Medium.

Under the conditions in the aforementioned experimental example 1, vibrations were applied to a particulate matter layer using a stainless steel porous plate 402 with hole diameters of 2 mm and a plate thickness of 0.5 mm in place of the spherical bodies 401. The behavioral state of the vibro-fluidizing is shown in the form of a photograph in FIG. 3(A), and an illustration thereof is shown in FIG. 3(B). FIG. 3(B) is that shown in FIG. 3(A) with a jet flow 302 of the particulate matter and the porous plate 402 color-processed with respect to contrast and intensity in order to highlight the flow conditions.

First, when excitation force due to vertical vibration of the vibrating device is applied to the particulate matter 3 within the container 2, particulate matter present at the surface of the particulate matter layer momentarily moves to the bottom of the container 2 before reappearing at the surface after two or three seconds, substantially the same as in the above experimental example 1.

Next, when excitation force is gradually increased to the high frequency region and behavior is observed, as shown in the photograph in FIG. 3(A), flow behavior can be confirmed where the particulate matter 3 spouts up in a columnar state from the holes in the porous plate 402.

Describing this state based on FIG. 3(B), an intermittent jet flow 302 can be confirmed for the particulate matter 3 in a region where the porous plate 402 is installed in an initial spouting state. When the excitation force is further increased, behavior can be confirmed where an intermittent jet flow 302 spouts in a state where the whole region of the porous plate has become one. During this time, when particulate matter 3 in the lower surface region of the porous plate spouts out in one go from each of the holes, there is repeated movement towards the bottom part of the container 2 and particulate matter 3 dispersed at the side walls of the container 2 is shown to move towards the bottom part of the container 2 from the peripheral edge of the porous plate 402.

Gushing was confirmed from the circumferential region of each hole when confirming the gushing state when employing a porous plate of a hole diameter of 1 cm. The porous plate 402 may also be a netlike item.

In the above experimental example, when pressure on the fluidizing environment is reduced, reduction in the gushing fluidization was confirmed, and it was understood that the device configuration of the present invention can also be applied under reduced pressure (reducing pressure within the container).

Figure 4:
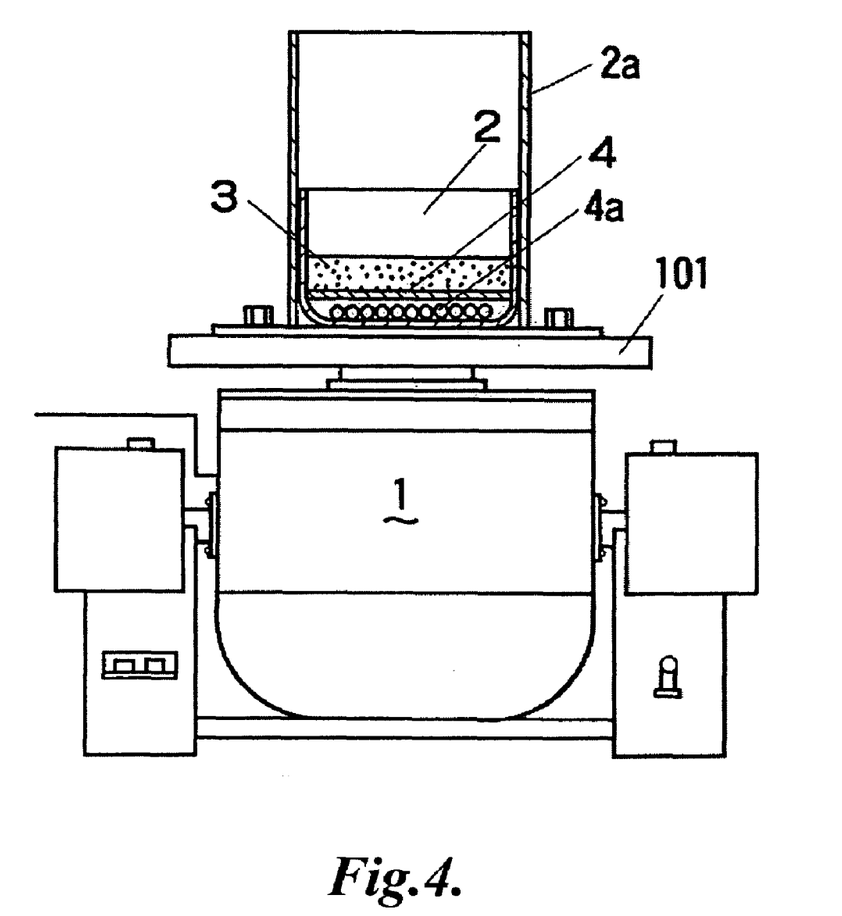
FIG. 4 is a view of the overall structure of a particulate matter vibro-fluidizing device of a second embodiment.
Figure 5A:
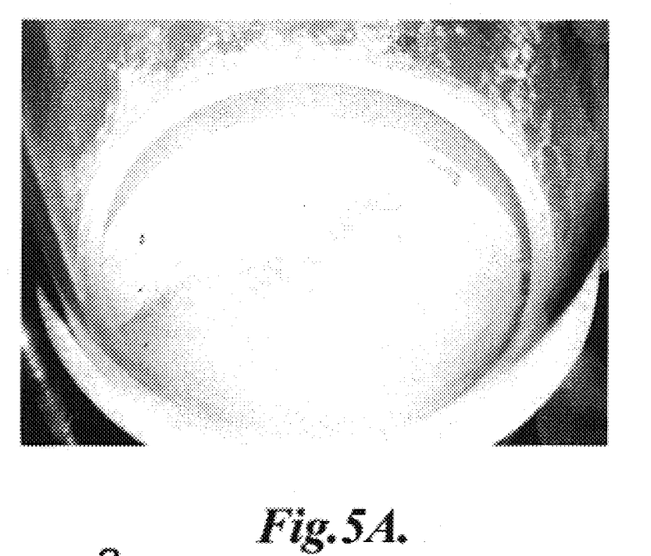
FIG. 5A is a photograph and, FIG. 5B is an illustration showing an example of a behavioral state of an experimental example 1 of the second embodiment.
Figure 5B:
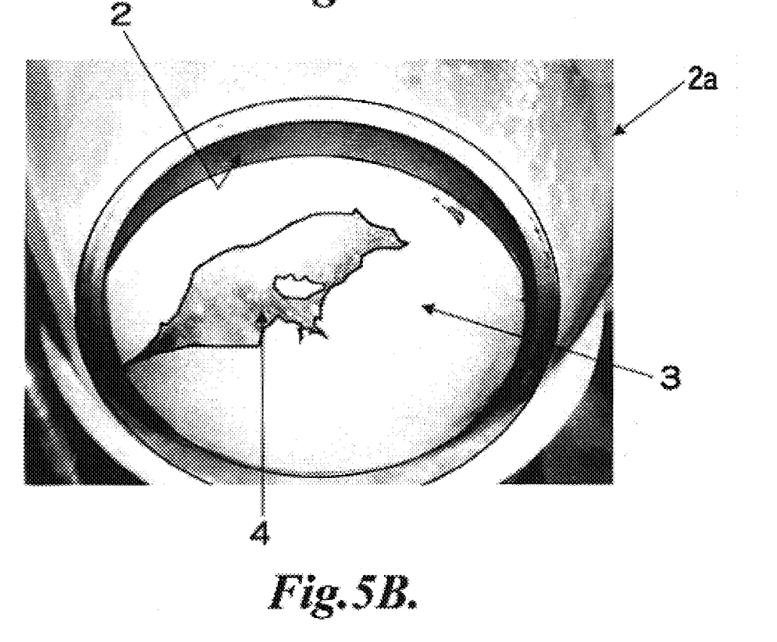
Figure 6A:
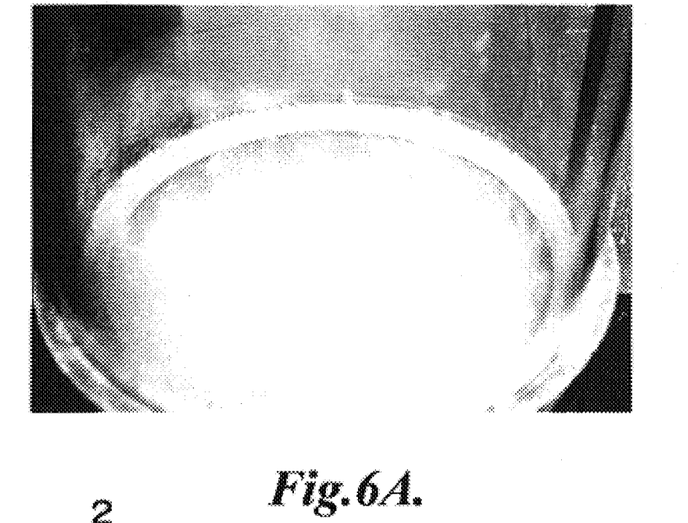
FIG. 6A is a photograph and, FIG. 6B is an illustration showing an example of a behavioral state of an experimental example 2 of the second embodiment.
Figure 6B:
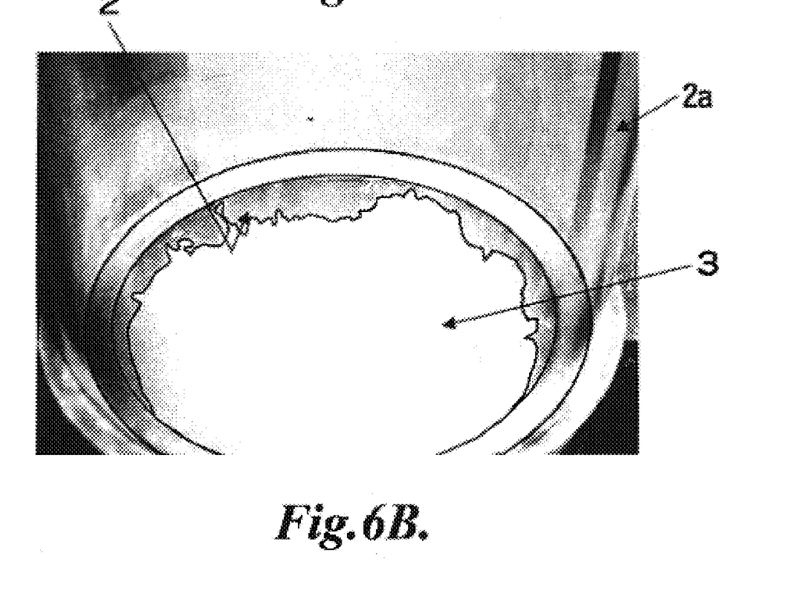
Figure 7:
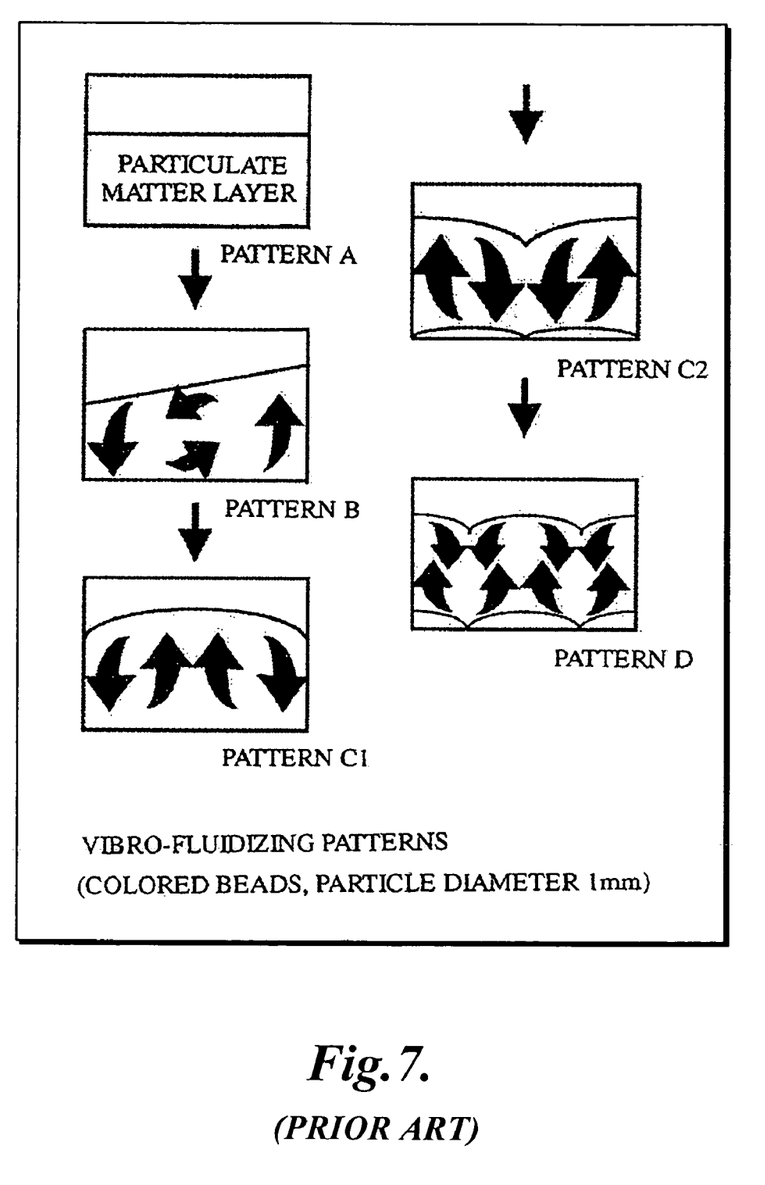
FIG. 7 is a view illustrating patterns of typical prior art particulate matter vibro-fluidizing behavior.

Next, a description is given of a second embodiment shown in FIG. 4 to FIG. 6. FIG. 4 is a partially cut-away overall view of a vibro-fluidizing device. A transparent resin cylindrical case 2a is fitted at the outer periphery of the container 2 on the vibrating table 101 so that particulate matter 3 with which the container 2 is filled is not dispersed to outside. The container 2 is filled with particulate matter 3, and a flat plate 4 constituting a vibrating medium comprising rubber sheeting material is provided at the bottom part of the container as means of vibrating the particulate matter 3. A plurality of a metal, spherical floating bodies 4a are interposed between the flat plate 4 and the container 2 so as to construct an aggregate, and amplifying means are provided for amplifying vibrations of the container 2.

By directly transmitting vibrations of the vibrating table 101 generated as a result of cooperative operation with the vibrating device 1, the container 2 comprises a group of different vibrating bodies by acting in unison with the floating bodies 4a and differing vibrations can therefore be applied to the flat plate 4.

Namely, as a result of the cooperative relationship the floating bodies 4a constituting the other different vibrating body are endowed with, vibrations from the container 2 constituting one of the different vibrating bodies are such that when the container 2 is subjected to vibrations directly from the vibrating device 1, this excitation force is also indirectly applied to the floating bodies 4a via the container 2 and the floating bodies 4a vibrate up and down and collide with the flat plate 4. During this time, different vibrating actions are applied at the flat plate 4 as a result of vibration of the container 2 and vibrations due to the collisions of the floating bodies 4a. Vibration of the container 2 is therefore amplified, and the particulate matter 3 is fluidized as a result of this vibration amplifying action.

In the second embodiment, with the cooperation relationship of the vibrating device 1 and the container 2, a configuration is adopted where the whole of the container is made to vibrate. This configuration may be arbitrarily selected, however, providing that the vibrations applied to whichever surface of the container are amplified and are applied to the particulate matter 3 within the container 2 even if just the bottom part of the container is made to vibrate. Further, the floating bodies 4a may be bar-shaped, cylindrical or plate-shaped etc. rather than being spherical, and may be made of metal, rubber or resin etc., or a combination thereof. Further, the material of the flat plate 4 is by no means limited to rubber material, and may be metal or resin, etc., and the shape is also by no means limited to being flat. It is also possible to construct the floating bodies 4a on the upper surface of the flat plate 4 and then treat the particulate matter 3.

Next, a description is given of an experimental example for vibro-fluidizational behavior of particulate matter when a vibro-fluidizing device of the above structure is employed. A hardened rubber sheet approximately 2 mm thick is used as the flat plate 4 and iron balls of an average diameter of 5 mm are used as the floating bodies 4a. Polyethylene particles (white) of an average diameter of 5 μm are used as the particulate matter 3 to be treated, the container 2 is filled with a particulate matter layer to a height of approximately 1 cm, and vibrations of a frequency of 1 to 10 kHz and amplitude of 0.1 to 10 mm are applied. The behavioral state of the vibro-fluidizing is shown in the form of a photograph in FIG. 5(A) and FIG. 6(A), and illustrations thereof are shown in FIG. 5(B) and FIG. 6(B). FIG. 5(B) and FIG. 6(B) show that shown in FIG. 5(A) and FIG. 6(A) color-processed with respect to contrast and intensity and with edges highlighted in order to highlight the flow conditions.

First, when a small excitation force due to vertical vibration of the vibrating device 1 is applied to the particulate matter 3 within the container 2, as shown in FIG. 5, slight swelling occurs in the even particulate matter layer and there is movement towards the outer periphery and the center of the container 2, with particulate matter 3 present at the surface of the particulate matter layer momentarily moving to the bottom of the container 2 before reappearing again at the surface after two or three seconds. In this behavioral state, flow behavior is observed with respect to mixing and dispersion from a state where a small amount of colored particles (red) of an average particle diameter of approximately 100 µm are put on a central portion of the surface of the particulate matter layer, but this flow behavior, even in the initial stage of vibration where excitation force is relatively slight, is such that the occurrence of superior circulation whereby the colored particles are momentarily and homogeneously dispersed over the entire area of the container 2 before reappearing again over the whole of the surface of the particulate matter layer.

It was therefore be understood that mixing and dispersion of particulate matter of different physical properties (particle diameter, density, etc.) can be achieved in a short time.

Next, when excitation force is gradually increased and fluidizing behavior is observed, as shown in FIG. 6, flow behavior was confirmed where the particulate matter 3 spouts up in an atomized state so as to be dispersed.

Describing this state based on FIG. 6(B), in the initial state where the excitation force is increased, the particulate matter 3 exhibits behavior whereby the particulate matter 3 swells upwards due to the vibrations of the flat plate 4 so as to be dispersed in columnar shapes. At this time, gathering of the particulate matter 3 was confirmed at the top part of the columnar dispersion flow but when the excitation force is further increased, this gathering gradually disappears and flow behavior is exhibited as shown in FIG. 6(A) whereby the whole of the particulate matter 3 is dispersed in atomized form.

In this dispersing fluidized state, the particulate matter can be treated in the same manner as related methods employing fluidizing media such as air and gas, etc., but has a feature that a fluidizing medium is not necessary every time particulate matter is processed, which means that compressors, air filters and solid/gas separators etc. are no longer required. This reduces both the cost of the device itself, and the running costs. There is also the advantage that the container 2 itself is small.

In the above experimental example, when the pressure of the fluidizing environment is gradually reduced, vibro-fluidizing behavior is confirmed in a ultra-high vacuum state of $1\times10^{-8}$ Torr (1.33 µPa), and excitation force is required from a normal pressure every time fluidizing for dispersion of the particulate matter 3 takes place, and in the vibro-fluidizing of the present invention this behavior is also confirmed under special low pressure environments (in a container at reduced pressure).

This therefore has the benefit that, with physical vapor deposition methods (PVD methods) typified by vacuum deposition, sputtering deposition and laser ablation, i.e. in cases where technology where atoms or molecules are clustered together by subjecting a solid target including atoms of a thin film structure that is to be subjected to a physical action, and transported to a substrate surface so as to form a thin film, a superior circulation can be achieved even for particulate matter located within a vacuum chamber and a thin film can therefore be formed (coated) evenly in a continuous or discontinuous manner on a surface of individual particles constituting particulate matter.

Further, comparing with results observed for related vibro-fluidizing when vibration is only applied to the container 2 when the same colored particles are used, the particulate matter 3 at the periphery is gradually covered until eventually all of the colored particles are covered so as not to be visible from the surface, which takes around one minute. The colored particles do not reappear at the surface of the particulate matter layer even when applying vibration where the excitation force is increased, circulation that is superior for dispersion and mixing does not occur, and it can be confirmed that there is almost no fluidizing in this related method.

In the embodiment of the present invention of the above configuration, by providing means for treating the particulate matter comprising vibrating means constituted by different types of vibrating body operating in cooperation, where the particulate matter is fluidization-treated by a cooperative vibrating action occurring between the different types of vibrating bodies, superior circulation where almost all particulate matter is momentarily homogeneously dispersed so as to reliably appear over the whole surface of the particulate matter layer can be obtained without applying excitation force to the particulate layer so that particulate matter gushes from a vibrating medium in order to obtain vibro-fluidization necessary in treatment of material particles in the crushing of an agglomerate powder and dispersion, mixing and drying of particulate matter. Treatment directly using just circulation due to vibro-fluidization can therefore be achieved without the use of a fluidizing medium such as air or gas etc., or the use of a solid medium such as impact balls, etc.

This means that circulation control capable of substantial change where the circulation behavior is such that the surface of the particulate matter layer is smooth while dispersion or columnar spouting is made to take place. It is also therefore possible to perform composite treatment such as reaction with an atomized gas, etc., coating and deposition etc. on just the spouting particulate matter. Miniaturization can therefore easily be achieved without necessitating an especially complex overall mechanical structure.

Regarding the aforementioned mechanism for vibro-fluidizing behavior, this is not sufficiently analyzed or elucidated using dynamics, but can be considered to have the following action, although this is an extremely difficult phenomena to predict.

(1) The vibrating body (container 2) cooperating directly with the vibrating device 1 transmits vertical energy of vibration to the particulate matter 3 and to the vibrating body (the vibrating medium 4) cooperating indirectly with the vibrating device 1. The vibrating medium 4 provides vertical motion due to physical properties of the vibrating medium 4 such as mass, size and shape, or in the case of an independent aggregate such as spherical bodies of columnar shapes etc., rotational movement, and induces characteristic vibrational energy.

(2) The container 2 and the vibrating medium 4 constitute different vibrating bodies (different types of vibrations) and their cooperative vibration operation causes composite energy to be created between the container 2 and the vibrating medium 4 due to microscopic collisions, etc. During this time, particulate matter 3 existing between the container 2 and the vibrating medium 4 gushes out in a fluidized manner together with gaseous molecules such as air, pushes upwards from the inside, or flies out, so that energy of acceleration is applied to provide upward movement (spouting) from the spaces and holes of the vibrating medium 4.

(3) Particulate matter 3 moving above the vibrating medium 4 is dispersed by the vibrations before again moving downwards from locations at the lower surface of the vibrating medium 4 where there is little particulate matter 3, i.e. at locations where there is little spouting. This repetition ensures that the circulation forms the fluidized bed, and almost all of the particulate matter 3 is evenly dispersed at high speed and then reliably appears over the whole of the surface of the particulate matter layer.

It is therefore confirmed that the vibro-fluidizing behavior is improved by the cooperative vibrating action of the different vibrations.

Further, by providing means for treating the particulate matter comprising a container operating in cooperation with the vibrating means and amplifying means for amplifying vibrations of the container, wherein the particulate matter within the container is vibration-treated by a vibrating action generated by the amplifying means, circulatory behavior due to vibro-fluidizing of particulate matter is provided in such a manner that the whole of the particulate matter circulates so as to be dispersed in an even manner over all of the surface of a particulate matter layer so that the particulate matter momentarily repeatedly appears even when different circulation occurs depending on the location within the container, and without the use of a fluidizing medium such as air or gas etc., or the use of a solid medium such as impact balls, etc. Complex processes such as crushing of an agglomerate powder, dispersion, mixing and drying of particulate matter and reactions with an atomized gas, or the forming of a thin film on a particulate matter surface, etc. can therefore be performed in a short period of time.

This circulatory behavior enables control of changes from circulation of slight swelling, to dispersing spouting so that treatment such as the aforementioned reactions and processing etc. can be carried out using circulation that corresponds to the desired purpose. This also enables superior circulatory behavior in special environments such as in a high vacuum etc., and enables miniaturization without requiring an especially complex overall mechanical structure.

Regarding the aforementioned mechanism for vibro-fluidizing behavior, this is not sufficiently analyzed or elucidated using dynamics, but can be considered to have the following action, although this is an extremely difficult phenomena to predict.

(1) The vertical vibrational energy of the vibrating device 1 is indirectly transmitted to the particulate matter 3, the flat plate 4, and the floating bodies 4a via the container 2 directly cooperating with the vibrating device 1. The flat plate 4 and the floating bodies 4a provide vertical motion due to physical properties of the vibrating medium 4 such as mass, size, shape, or material, or in the case of an independent aggregate where the floating bodies are spherical bodies of columnar shapes etc., rotational movement, and induce characteristic vibrational energy.

(2) The container 2, flat plate 4 and floating bodies 4a constitute different vibrating bodies (different types of vibrations) and their cooperative vibration operation causes composite energy to be transmitted to the particulate matter 3. During this time, if the excitation force is small, the influence of the amplified vibrational action due to impact vibrations due to the floating bodies 4a is small. However, a composition of different kinds of vibration actions due to vibrations of each of the container 2, the flat plate 4 and the floating bodies 4a is applied to the particulate matter 3. There is therefore a smooth fluidized bed and a vibro-fluidized layer (circulating flow) that is superior compared to the case of the vibration action of just the container 2 is formed.

If the excitation force is large, the influence of the amplified vibration action due to vibrations caused by collisions of the floating bodies 4a is large and a composition of different types of vibration actions is applied to the particulate matter 3 centered about the collision vibration energy so that a desirable columnar or atomized fluidized bed is formed.

(3) In the process where the excitation energy is made large, columnar dispersing fluidization can be seen where vertical vibration of the flat plate 4 is in synchronism with the vertical movement of the particulate matter 3. However, when excitation force exceeding a predetermined value is applied, vertical motion of the particulate matter 3 becomes disjointed in units of particles and circulation that changes to atomized dispersion can be seen. A superior fluidized bed dispersed in this manner is formed, and the particulate matter 3 is homogeneously dispersed at high speed and is shown so as to behave so as to repeatedly and reliably appear at the surface of the particulate matter layer.

It can therefore be confirmed that the vibro-fluidizing behavior is improved by the amplified vibrating action of the different vibrations.

INDUSTRIAL APPLICABILITY

By providing means for treating the particulate matter comprising vibrating means constituted by different types of vibrating body operating in cooperation, where the particulate matter is fluidization-treated by a cooperative vibrating action occurring between the different types of vibrating bodies, and providing means for treating the particulate matter comprising a container operating in cooperation with the vibrating means and amplifying means for amplifying vibrations of the container, where the particulate matter within the container is vibration-treated by a vibrating action generated by the amplifying means, circulatory behavior due to vibro-fluidizing of particulate matter is produced in such a manner that the whole of the particulate matter circulates so as to be dispersed in an even manner over all of the surface of a particulate matter layer so that the particulate matter momentarily repeatedly appears even when different circulation occurs depending on the location within the container, and without the use of a fluidizing medium such as air or gas etc., or the use of a solid medium such as impact balls, etc. Composite processes such as crushing of an agglomerate powder, dispersion, mixing and drying of particulate matter and reactions with an atomized gas, or the forming of a thin film on a particulate matter surface, etc. can therefore be performed in a short period of time.

This circulator behavior enables control of changes from circulation of slight swelling, to dispersion spouting or columnar spouting so that treatment such as the aforementioned reactions and processing etc. can be carried out using circulation that corresponds to the desired purpose. This also enables superior circulatory behavior in special environments such as in a vacuum etc., and enables miniaturization without requiring an especially complex overall mechanical structure.

What is claimed is:

1. A particulate matter vibro-fluidizing apparatus comprising vibrating means and means for treating the particulate matter, said vibrating means providing a vibrating motion in a substantially vertical direction, said means for treating the particulate matter comprising a set of different types of vibrating bodies operating in cooperation with said vibrating means, said vibrating bodies comprising a container having a generally flat horizontal bottom, said container being filled with the particulate matter defining a particulate matter layer, and a vibrating medium installed within the container so that said vibrating medium is at least partially disposed within said particulate matter layer, said vibrating medium being unattached to the container, and said means for treating the particulate matter providing a cooperative vibrating action occurring between said different types of vibrating bodies for controlling vibro-fluidizational behavior of said particulate matter in said particulate matter layer so as to generate circulation in said particulate matter layer by applying vibrations thereto where said particulate matter repeatedly appears at the surface of said particulate matter layer from the bottom of said container.

2. The particulate matter vibro-fluidizing apparatus of claim 1, wherein the cooperation of the different vibrating bodies of the vibrating means comprises cooperation where the vibrating means is coupled with one of the vibrating bodies, and cooperation where the other vibrating body receives vibrations from the one vibrating body.

3. The particulate matter vibro-fluidizing apparatus of claim 1, wherein the cooperation of the different types of vibrating bodies of the vibrating means is cooperation coupling with the vibrating means in such a manner that each vibrating body is controlled by an individual vibration.

4. The particulate matter vibro-fluidizing apparatus of claim 1, wherein the vibrating medium is a porous plate.

5. The particulate matter vibro-fluidizing apparatus of claim 1, wherein the vibrating medium is an aggregate comprising a plurality of spherical bodies.

6. A particulate matter vibration treatment apparatus having vibrating means and means for treating the particulate matter, said means for treating the particulate matter comprising:

a container having a bottom and operating in cooperation with said vibrating means; and amplifying means for amplifying vibrations of the container;

wherein said amplifying means comprises a plate being provided inside said container spaced away from the bottom of the container and floating bodies being provided between said plate and the container so as to collide with said plate, and wherein said particulate matter placed on said plate is to be vibration-treated by a cooperative vibration action of vibration due to the amplifying means and vibration of the container.

7. The particulate matter vibration treatment apparatus of claim 6, wherein the vibrating means cooperates in such a manner as to apply vertical vibrations to the bottom part of the container.

8. The particulate matter vibration treatment apparatus of claim 6, wherein the vibrating means cooperates in such a manner as to apply vertical vibrations to the bottom part of the container.

9. The particulate matter vibration treatment apparatus of claim 6, wherein the vibration action comprises a cooperative vibration action of vibration due to the amplifying means and vibration of the container.

10. The particulate matter vibration treatment apparatus of claim 6, wherein the plate is comprised of a rubber sheet, a metal material or a resin material.

11. The particulate matter vibration treatment apparatus of claim 6, wherein the floating bodies are constituted by a plurality of spherical bodies made of metal, resin or rubber.

12. The particulate matter vibration treatment apparatus of claim 6, wherein the particulate matter treatment means is used within a vacuum.

\* \* \* \* \*